United States Patent [19]

Redzisz

[11] Patent Number: 5,893,502

[45] Date of Patent: Apr. 13, 1999

[54] CARRYING CASE/WEARABLE VEST

[75] Inventor: Andrzey Redzisz, Donners Grove, Ill.

[73] Assignee: Chong H. Lee, Lake Foret, Ill.

[21] Appl. No.: 08/541,814

[22] Filed: Oct. 10, 1995

[51] Int. Cl.[6] ................................................... A45F 4/02
[52] U.S. Cl. ........................... 224/577; 224/586; 2/94; 383/4; 190/1; 206/317
[58] Field of Search ........................ 224/575, 577, 224/586; 2/94, 102, 462; 206/315.11, 317; 383/4; 190/1

[56] References Cited

U.S. PATENT DOCUMENTS

| | | | |
|---|---|---|---|
| 262,577 | 8/1882 | Day | 224/577 |
| 3,191,652 | 6/1965 | Benson et al. | 206/317 |
| 4,475,247 | 10/1984 | Lee | 206/317 |
| 4,601,067 | 7/1986 | Buonassissi | 2/94 |
| 4,637,076 | 1/1987 | Tartt et al. | 224/577 |
| 5,014,359 | 5/1991 | Hanson | 2/94 |
| 5,278,998 | 1/1994 | Book | 190/1 |
| 5,370,113 | 12/1994 | Parsons | 2/102 |
| 5,779,329 | 9/1998 | Hauschild | 2/102 |

FOREIGN PATENT DOCUMENTS 457159  5/1950  Italy ........................................... 190/1

*Primary Examiner*—Allan N. Shoap
*Assistant Examiner*—Gregory M. Vidovich
*Attorney, Agent, or Firm*—Shanley and Baker

[57] ABSTRACT

The carrying case-wearing vest which is convertible between a carrying case for fishing rods, guns and hunting and fishing accessories and a vest garment configuration includes a unit of material having two mirror image panels (a right and left panel) which may be folded together and releasably connected by a full perimeter zipper to form a carrying case configuration which may support the transportation of a fishing pole or hunting artillery. The upper corner of the front right panel may be fastened by a buckle to the back side of the left lower panel and the upper corner of the left front panel may be fastened by a buckle to the back side of the lower corner of the right panel to form a vest for wearing the carrying case in a vest garment configuration.

4 Claims, 6 Drawing Sheets

CARRYING CASE/WEARABLE VEST

BACKGROUND OF THE INVENTION

1. Field of Invention

The present invention relates to a carrying case-wearable vest, which is convertible between a carrying case configuration and a vest garment configuration.

2. Description of the Prior Art

A. Lapham, U.S. Pat. No. 1,879,341. Discloses a vest having pockets, an attachable neck strap, and straps which extend around the waist to prevent the vest from shifting. Although the Lapham vest is designed to support a rod and reel, its construction is quite different than the present invention in that it does not suggest a vest which is convertible to a hand or shoulder carrying case configuration which can be used for transporting fishing as well as hunting articles.

B. Altick, U.S. Pat. No. 2,864,541. Discloses a shell retainer and dispenser consisting of elongated containers which attach to a hunting vest.

C. DeSpain, U.S. Pat. No. 3,848,267. Discloses a vest having two identical front and back sections each having a large pocket which can be used for transporting articles in a balanced load between the front and back pockets. In addition, a removable cushion may be placed in the pockets to form a seat cushion.

D. Arisland, U.S. Pat. No. 4,483,469. Discloses a vest having a pair of pouches which are connected at the lower edge of each front panel of the vest and strapped to the wearer around the waist. The pouches may be connected by a zipper along juxtaposed edges so that they may be fastened together to provide a storage department.

E. Tartt, U.S. Pat. No. 4,637,076. Discloses a vest which is convertible to a purse configuration. The construction of the Tartt patent is different from the present invention. The Tartt patent comprises of a unit of material having a lower portion sectioned into laterally contiguous rectangular panels and an upper portion extending upwardly from the lower portion and divided into a central back panel and a pair of side panels having snap fasteners at the upper ends. The side panels may be fastened to the back panels to form a vest garment configuration. The back panel and one side panel may also be folded onto the contiguous panels which may then be folded one upon another and releasably connected by the vertical fasteners to form a purse configuration.

SUMMARY OF INVENTION

It as the object of the present invention to provide a carrying case which may be worn as a vest garment when desired. The prior art in general, fails to disclose a vest-bag convertible between a bag configuration and a vest configuration which comprises a unlit of material having two mirror image panels ( a right and left panel) which may be folded together and releasably connected by a full perimeter zipper to form a carrying case configuration which may support the transportation of a fishing pole or hunting artillery. The upper corner of the front right panel may be fastened by a buckle to the back side of the left lower panel and the upper corner of the left front panel may be fastened by a buckle to the back side of the lower corner of the right panel to form a vest for wearing the carrying case in a vest garment configuration.

The object of this inventor is to provide a carrying case-wearable vest with ample length so to provide a storage compartment for carrying hunting and fishing articles, eliminating the need to carry a fishing pole or rifle case and freeing the hands for fishing and hunting.

Other objects of this invention are to provide a carrying case-wearable vest which is simple in construction, rugged and durable in use, waterproof, and which will provide the user with protection from strong winds because of its padding. This invention also provides fluorescent patches on the vest so to allow others to identify the wearer in the dark. In addition, the many extra pockets contained in the vest will provide ample storage compartments for comfortably carrying a beverage, knife or fishing tackle or hunting accessories.

Other objects of the invention will become apparent from time to time throughout the specification and claims as hereinafter related.

The above noted objects and other objects of the invention are accomplished by a carrying case-vest convertible between a carrying case configuration and a vest garment configuration as more fully described above.

DETAILED DESCRIPTION OF THE DRAWINGS

Figure 1:
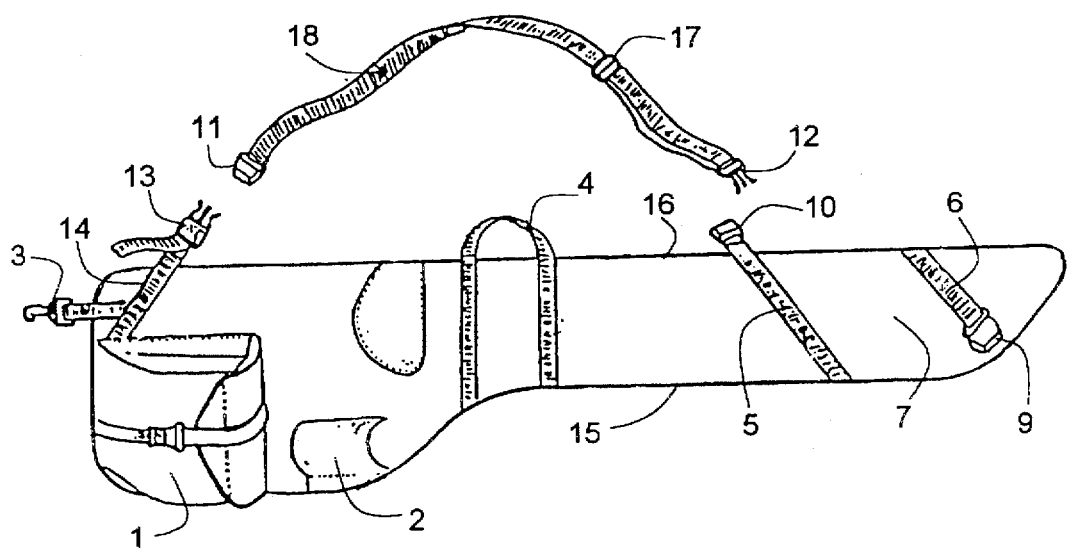
FIG. 1. Front view pictorial view of the right side of the convertible carrying case-vest in accordance with the present invention in use as a carrying case.

Referring to the drawings by numerals of reference, there is shown in FIG. 1 the front pictorial view of the right side of the convertible carrying case-vest in accordance with the present invention in use as a carrying case. The right side waterproof nylon surface carrying case 7 comprises a flap pocket accessory 1 which closes inside, via Velcro, generally known as a hook and loop fastener, and which also remains closed via an external release buckle, a beverage pocket 2, a plastic snap (trophy) hook 3, a one inch polyester webbing handle 4 for hand carrying one and a half inch polyester webbing 5, 6 and 14, side release buckles 9,10,11,12, and 13, binding 16, 1 slide 17, a one and a half inch polyester webbing shoulder strap 18 and a zipper 20 which goes completely around the perimeter 15 of the case 7.

Figure 2:
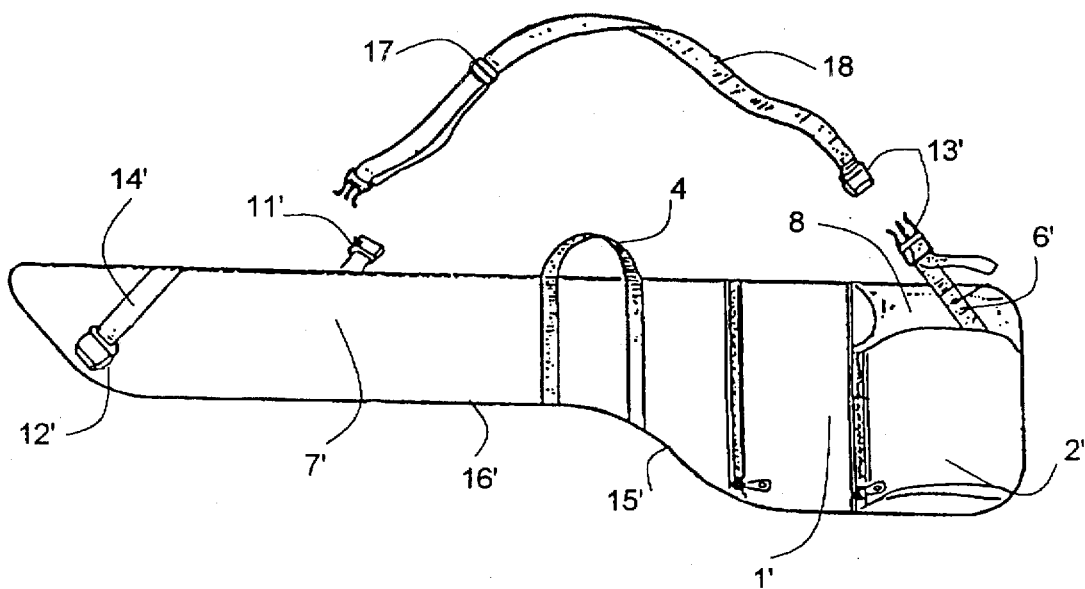
FIG. 2. Front view pictorial view of the left side of the convertible carrying case-vest in accordance with the present invention in use as a carrying case.

FIG. 2 shows the front pictorial view of the left side of the convertible carrying case-vest in accordance with the present invention in use as a carrying case. The left side waterproof nylon surface carrying case 7' comprises a pocket 1' with a zipper for accessories, a sandwich pocket 2', a knife pocket 8, the one and a half polyester shoulder strap 18', one and a half inch polyester webbing 6' and 14', a side release interlocking buckles 11', 12', and 13', the slide 17, binding 16', a one inch polyester webbing handle 4', and a zipper 20 which goes completely around the perimeter 15' of the case 7'.

Figure 3:
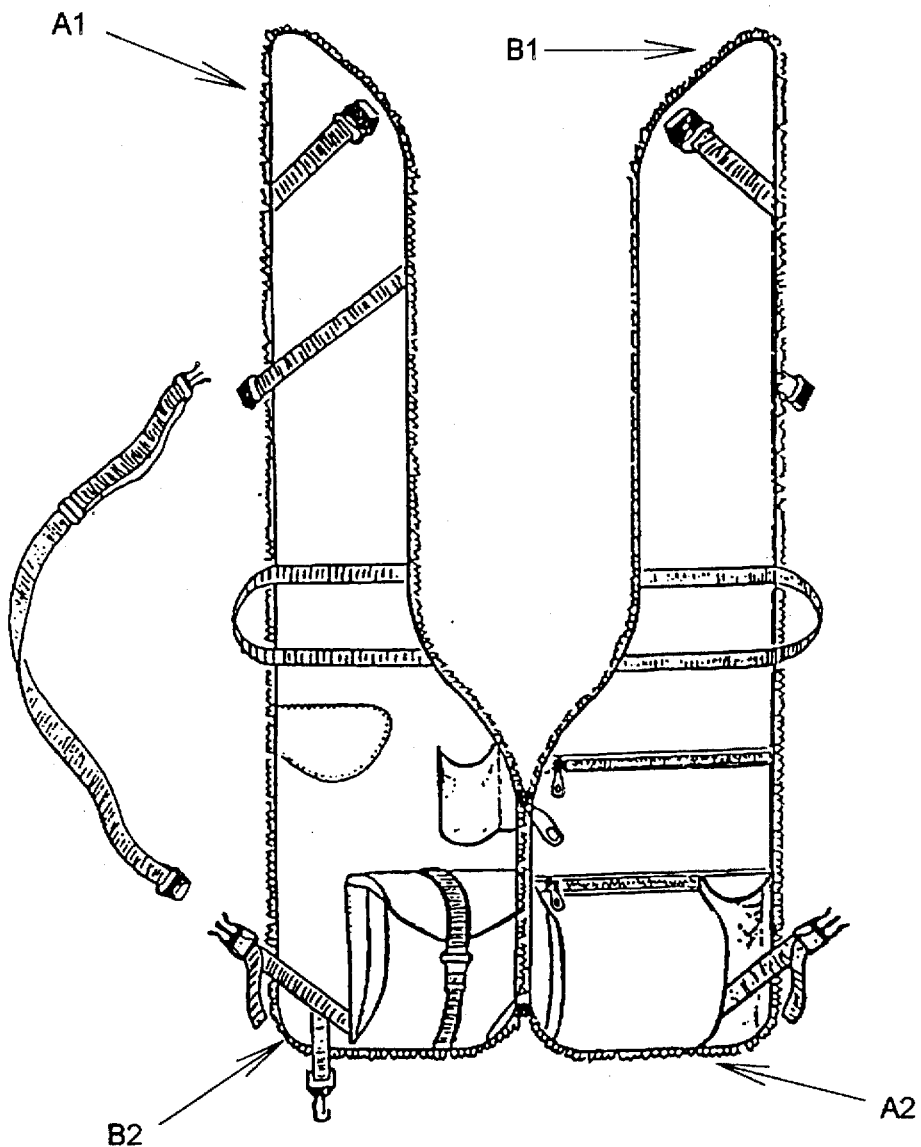
FIG. 3. Plan view of the exterior of the convertible carrying case-vest illustrating the folding sequence in the conversion from carrying case to vest.

FIG. 3 shows the front view of unzipped carrying case-vest. For ease of understanding, the upper right and left corners of the carrying case-vest are designated B1 and A1 and the lower right and left corners are designated A2 and B2, respectively.

Figure 4:
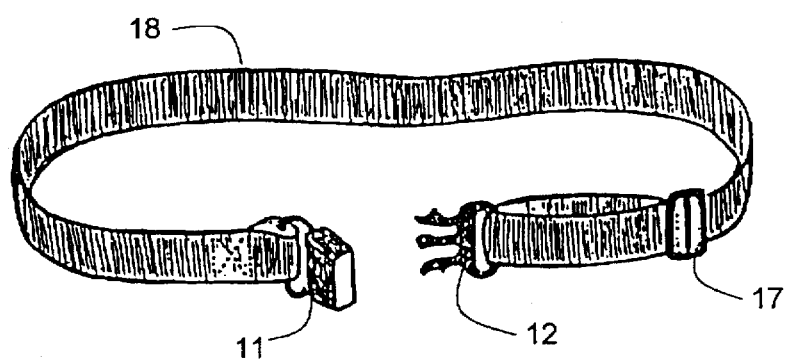
FIG. 4. Plan view of shoulder strap.

FIG. 4 is the shoulder strap which can be used as a belt for accessories.

Figure 5:
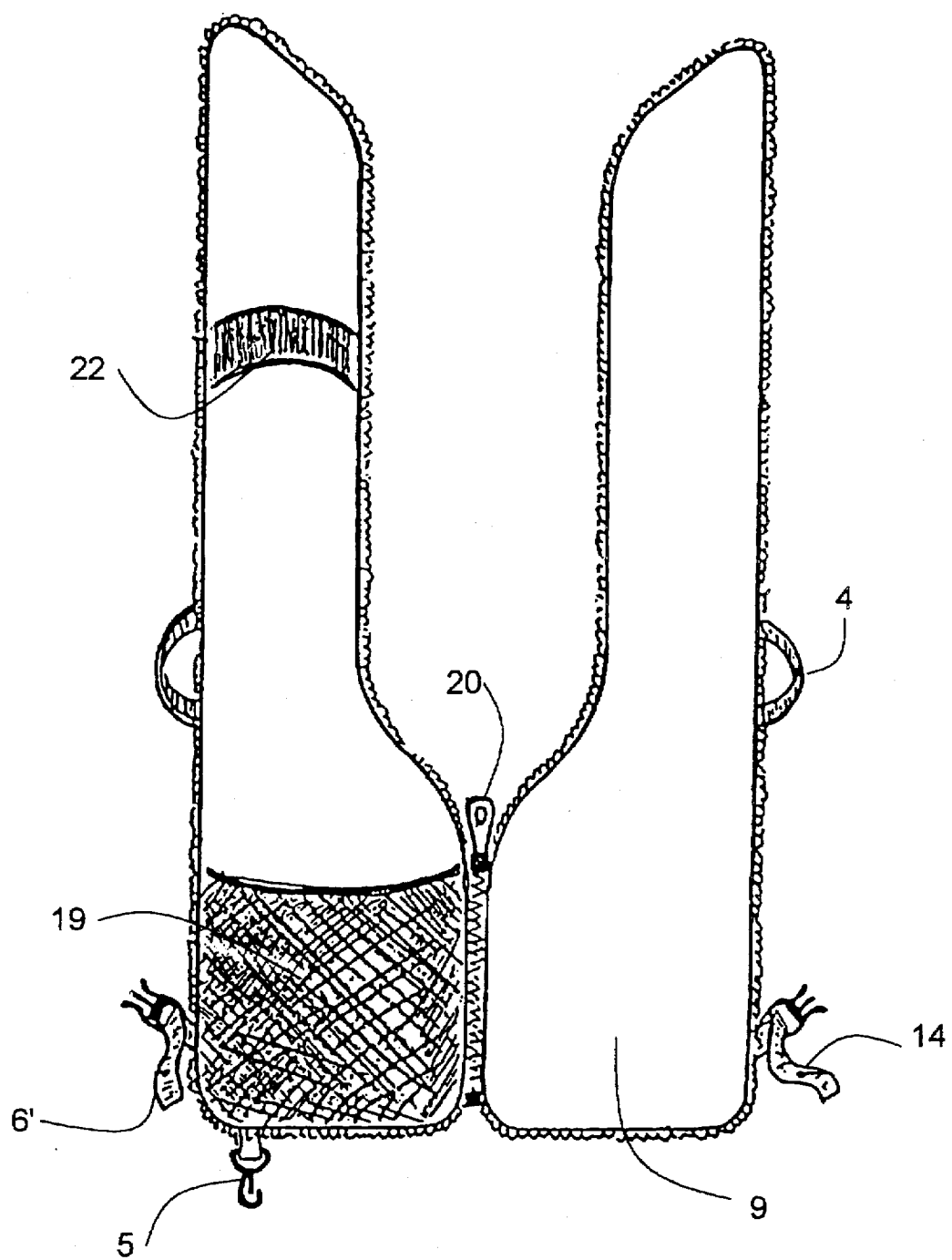
FIG. 5. Plan view of the interior of the convertible carrying case-vest illustrating the folding sequence in the conversion from carrying case to vest.

FIG. 5 is an inside view of the unzipped carrying case-vest. The inside contains a mesh pocket 19 and a two inch elastic band 22. The hunting gun or fishing pole can be slid under the elastic band with the ends of the pole or gun pushed down to the mesh pocket 19. This creates no movement on the gun or pole when carrying or when unzipping the case. The inside of the carrying case-vest is comprised of a long pull zipper 20, and one half inch cotton or three sixteenth inch foam padding between the surface of the vest and lining 9.

Figure 6:
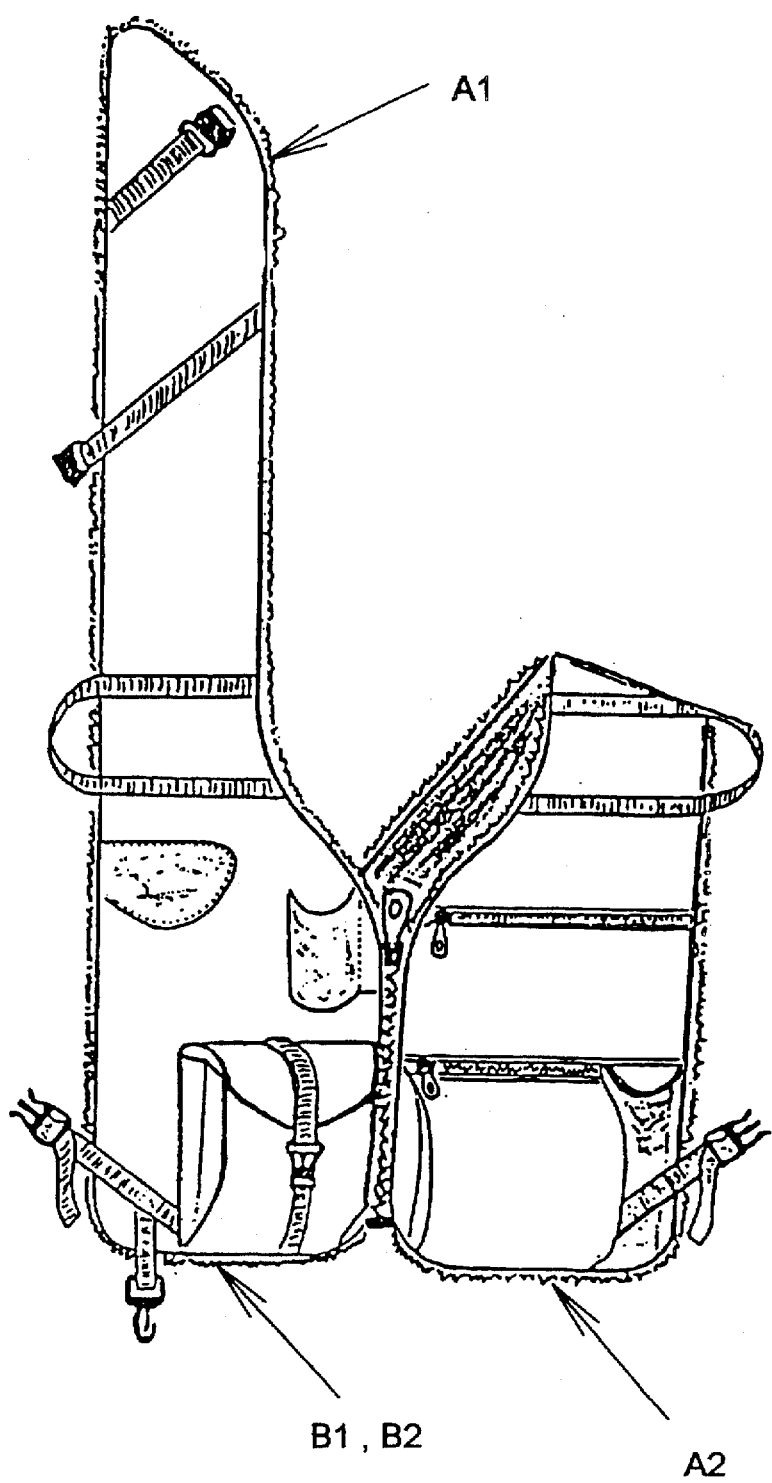
FIG. 6. Plan view of the front exterior of the convertible carrying case-vest illustrating the folding sequence in the conversion from case to vest.

FIG. 6 represents the first phase of the transformation of the carrying case to a vest garment B1 folds back and crosses in back to B2. The side release buckle at the top of B1 in FIG. 3 snaps with the side release interlocking buckle down at the corner of B2.

Figure 7:
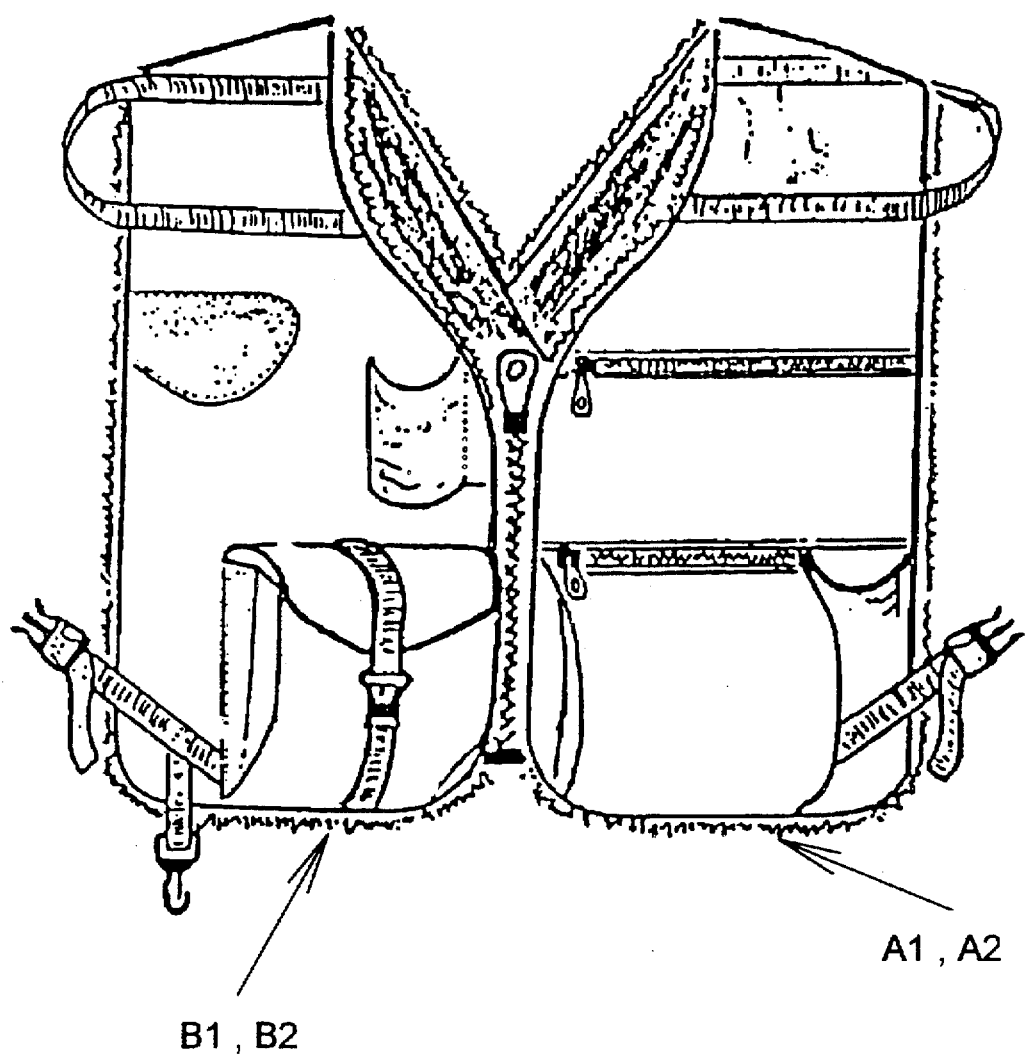
FIG. 7. Plan view of the front exterior side of the vest.

FIG. 7 completes the transformation. A1 also folds and crosses in the back to A2 with the side release buckle at the top of A1 snapping with the side release interlocking buckle found down at the corner of A2. The snaps on the sides adjust to variable body sizes. The carrying case is now transformed into a vest with numerous pockets for storage.

Figure 8:
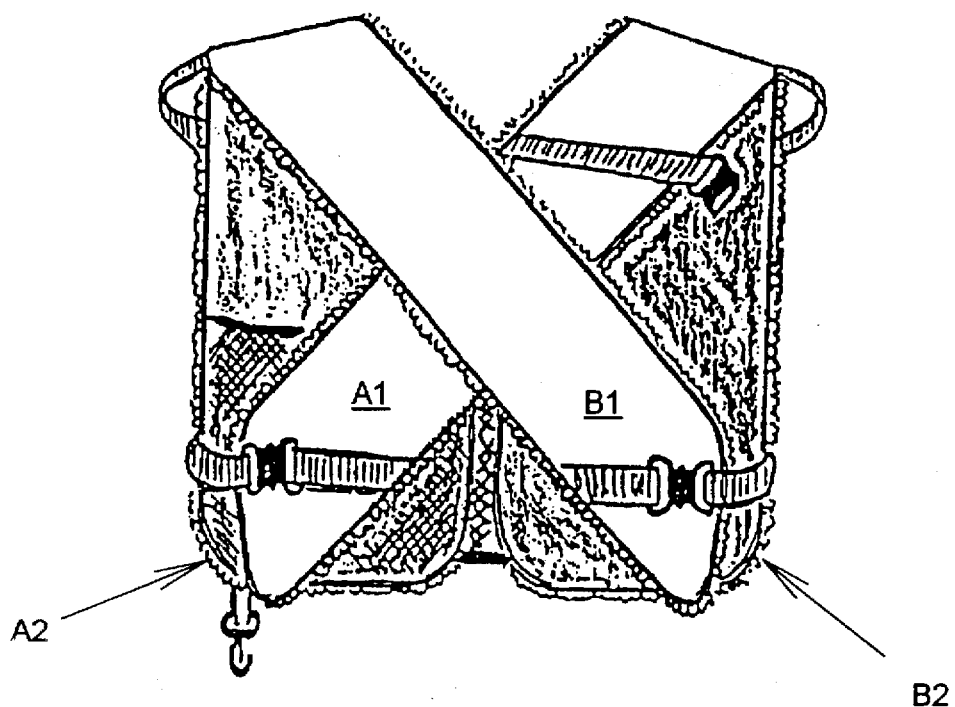
FIG. 8. Plan view of the back exterior side of the vest.
Figure 9:
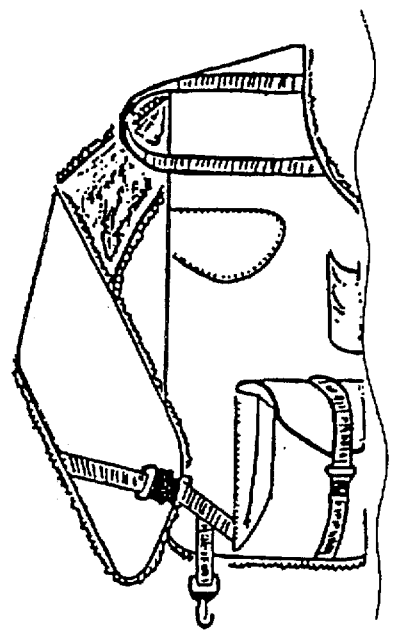
FIG. 9. Plan view of the side exterior of the vest.

FIG. 8 shows the back view of the vest and how B1 crosses to B2 and A1 crosses to A2. FIG. 9 show the side view of how A1 fastens to A2.

What I claim as my invention is the following:

1. An article carrier which is selectively convertible between a carrying case configuration for fishing rods, guns, and hunting and fishing accessories and a vest garment configuration, said carrier comprising:

a right front panel and a left front panel which is a mirror image of said right front panel;

said right and left front panels each having a full perimeter zipper which selectively mate to form a carrying case in said carrying case configuration;

said right front panel having an upper corner which is selectively and releasably interlocked by a first webbing-mounted fastener buckle to said left front panel at a lower left back side thereof when the left and right front panels are not connected by said zippers and said left front panel has an upper front corner which is selectively and releasably interlocked by a second webbing-mounted buckle fastener to said right front panel at a lower back side corner thereof when said left and right front panels are not connected by said zippers to form a vest for wearing about the shoulders and central torso of an individual in the vest garment configuration.

2. An article carrier according to claim 1 wherein each of said panels each include at least one pocketed connected thereto.

3. An article carrier according to claim 1 wherein said first and second webbing-mounted buckle fasteners is adjustable.

4. An article carrier according to claim 1 further including a shoulder strap releasably connected to carrier in the carrying case configuration.

* * * * *

UNITED STATES PATENT AND TRADEMARK OFFICE
CERTIFICATE OF CORRECTION

PATENT NO. : 5,893,502
DATED : April 13, 1999
INVENTOR(S) : Redzisz

It is certified that error appears in the above-identified patent and that said Letters Patent is hereby corrected as shown below:

Column 4, line 28, delete "each"

Column 4, line 28, delete "include" and insert --includes--

Column 4, line 28, delete "pocketed" and inser --pocket--.

Column 4, line 31, change "is" to --are--.

Signed and Sealed this

Tenth Day of August, 1999

Attest:

Q. TODD DICKINSON

Attesting Officer

Acting Commissioner of Patents and Trademarks